United States Patent
Zwisler et al.

(10) Patent No.: US 8,656,070 B2
(45) Date of Patent: Feb. 18, 2014

(54) STRIPING WITH SCSI I/O REFERRALS

(75) Inventors: Ross E. Zwisler, Lafayette, CO (US);
Andrew J. Spry, Wichita, KS (US);
Gerald J. Fredin, Wichita, KS (US);
Kenneth J. Gibson, Lafayette, CO (US)

(73) Assignee: LSI Corporation, San Jose, CA (US)

(*) Notice: Subject to any disclaimer, the term of this patent is extended or adjusted under 35 U.S.C. 154(b) by 586 days.

(21) Appl. No.: 12/387,178

(22) Filed: Apr. 29, 2009

(65) Prior Publication Data

US 2010/0281191 A1    Nov. 4, 2010

(51) Int. Cl.
*G06F 3/00* (2006.01)
(52) U.S. Cl.
USPC .......... 710/36; 710/5; 710/38; 709/214; 709/217; 709/238; 709/244; 711/114; 711/154; 711/165; 711/207

(58) Field of Classification Search
None
See application file for complete search history.

(56) References Cited

U.S. PATENT DOCUMENTS

| | | | |
|---|---|---|---|
| 6,795,895 B2* | 9/2004 | Merkey et al. | 711/114 |
| 6,862,609 B2* | 3/2005 | Merkey | 709/214 |
| 6,898,666 B1* | 5/2005 | Henry et al. | 711/114 |
| 7,778,960 B1* | 8/2010 | Chatterjee et al. | 707/609 |
| 7,849,265 B2* | 12/2010 | Hara et al. | 711/114 |
| 8,015,354 B2* | 9/2011 | Tsuji | 711/114 |
| 8,055,815 B2* | 11/2011 | Zwisler et al. | 710/38 |
| 8,171,178 B2* | 5/2012 | Zwisler et al. | 710/5 |
| 8,219,715 B2* | 7/2012 | Zwisler et al. | 710/5 |
| 8,307,240 B2* | 11/2012 | Fredin et al. | 714/5.1 |
| 8,332,549 B2* | 12/2012 | Spry et al. | 710/36 |
| 2002/0026558 A1* | 2/2002 | Reuter et al. | 711/114 |
| 2005/0177684 A1* | 8/2005 | Hoshino et al. | 711/114 |
| 2005/0232285 A1* | 10/2005 | Terrell et al. | 370/401 |
| 2005/0289218 A1* | 12/2005 | Rothman et al. | 709/203 |
| 2006/0248292 A1* | 11/2006 | Suresh | 711/154 |
| 2007/0073988 A1* | 3/2007 | Shibayama et al. | 711/165 |
| 2007/0283087 A1* | 12/2007 | Hannigan | 711/114 |
| 2008/0183965 A1* | 7/2008 | Shiga et al. | 711/114 |
| 2009/0106493 A1* | 4/2009 | Tsuji | 711/114 |
| 2009/0157956 A1* | 6/2009 | Kano | 711/112 |
| 2010/0125857 A1* | 5/2010 | Dommeti et al. | 719/326 |
| 2012/0297159 A1* | 11/2012 | Honda et al. | 711/165 |

OTHER PUBLICATIONS

'Veritas Storage Foundation™ 5.0 Dynamic Multi-pathing' by Symantec, May 2007.*
'EMC CLARiiON Fibre Channel Storage Fundamentals' White Paper, EMC Corporation, Sep. 2007.*
'EMC CLARiiON Best Practices for Fibre Channel Storage' Engineering White Paper, EMC Corporation, Mar. 16, 2004.*
'Powervault MD3000 and MD3000i—Array Tuning Best Practices' White Paper by Dell, Dec. 2008.*
'SAN Volume Controller Best Practices and Performance Guidelines' by IBM Redbooks, Dec. 2008.*
'Tuning External IBM Storage Subsystems—Best Practices' by IBM Corporation, copyright 2008.*
'The Benefits of Clustered Block Storage' by Ray Lucchesi, copyright 2008, InfoStor.*

* cited by examiner

*Primary Examiner* — Steven Snyder
(74) *Attorney, Agent, or Firm* — Suiter Swantz pc llo

(57) ABSTRACT

The present disclosure is directed to a method for communication between an initiator system and a block storage cluster. The method may comprise initiating an input/output (I/O) request from the initiator system to a first storage system included in a plurality of storage systems of the block storage cluster, each of the plurality of storage systems comprising a plurality of data segments; receiving a referral response from the first storage system, the referral response providing information describing a layout of data requested in the I/O request; obtaining a virtual disk count, a segment size, and at least one indexed port identifier based on the referral response; and directing the I/O request from the initiator system to the block storage cluster based on the virtual disk count, the segment size, and the at least one indexed port identifier.

20 Claims, 5 Drawing Sheets

| Segment Start | Port |
|---|---|
| LBA 100 | Port 301 |
| LBA 110 | Port 302 |
| LBA 120 | Port 300 |
| LBA 130 | Port 301 |
| ⋮ | ⋮ |
| LBA 190 | Port 301 |

FIG. 2

| Starting LBA | Port |
|---|---|
| LBA 0 | Port 300 |
| LBA 10 | Port 301 |
| LBA 20 | Port 302 |
| LBA 30 | Port 300 |
| ⋮ | ⋮ |
| LBA $L_N$ | Port 302 |

FIG. 3

| Virtual Disk Count | |
|---|---|
| Segment Size | |
| Virtual Disk Index | Port |
| Index $I_0$ | Port $P_0$ |
| Index $I_1$ | Port $P_1$ |
| ⋮ | ⋮ |
| Index $I_N$ | Port $P_N$ |

*FIG. 4*

| Virtual Disk Count: 3 | |
|---|---|
| Segment Size: 10 | |
| Virtual Disk Index | Port |
| Index 1 | Port 301 |
| Index 2 | Port 302 |

*FIG. 5*

| Virtual Disk Count: 3 | |
|---|---|
| Segment Size: 10 | |
| Virtual Disk Index | Port |
| Index 0 | Port 300 |
| Index 1 | Port 301 |
| Index 2 | Port 302 |

*FIG. 6*

| Segment Index | Port ID |
|---|---|
| Segment $S_0$ | Port $P_0$ |
| Segment $S_1$ | Port $P_1$ |
| Segment $S_2$ | Port $P_2$ |
| ⋮ | ⋮ |
| Segment $S_N$ | Port $P_N$ |

*FIG. 7*

| Segment Index | Port ID |
|---|---|
| Segment 10 | Port 300 |
| Segment 11 | Port 300 |
| Segment 13 | Port 302 |

STRIPING WITH SCSI I/O REFERRALS

FIELD OF THE INVENTION

The present invention relates to the field of electronic data storage and particularly to a system and method for providing Small Computer System Interface (SCSI) Input/Output (I/O) referrals for storage systems that utilize data striping.

BACKGROUND OF THE INVENTION

Small Computer System Interface (SCSI) Input/Output (I/O) referral techniques may be utilized to facilitate communication between an initiator system and a block storage cluster. For example, the initiator system (e.g., a data requester) may transmit a data request command to a first storage system of the block storage cluster. If the data requested is stored in the first storage system, the data may be transferred to or from the initiator system. However, if a portion of the data requested is not stored by the first storage system, but is stored by a second storage system of the block storage cluster, a referral response may be transmitted from the first storage system to the initiator system. The referral response may provide an indication to the initiator system that not all of the requested data was transferred. The referral response may further provide information for directing the initiator system to the second storage system. Currently available storage systems may not be configured for providing such referral responses efficiently when data striping is utilized by the storage systems.

Therefore, it may be desirable to provide a storage system which addresses the above-referenced problems of currently available storage system solutions.

SUMMARY OF THE INVENTION

Accordingly, an embodiment of the present invention is directed to a method for communication between an initiator system and a block storage cluster. The method may comprise initiating an input/output (I/O) request from the initiator system to a first storage system included in a plurality of storage systems of the block storage cluster, each of the plurality of storage systems comprising a plurality of data segments; receiving a referral response from the first storage system, the referral response providing information describing a layout of data requested in the I/O request; obtaining a virtual disk count, a segment size, and at least one indexed port identifier based on the referral response; and directing the I/O request from the initiator system to the block storage cluster based on the virtual disk count, the segment size, and the at least one indexed port identifier.

A further embodiment of the present invention is directed to a storage infrastructure. The storage infrastructure may comprise means for initiating an input/output (I/O) request from the initiator system to a first storage system included in a plurality of storage systems of the block storage cluster, each of the plurality of storage systems comprising a plurality of data segments; means for receiving a referral response from the first storage system, the referral response providing information describing a layout of data requested in the I/O request; means for obtaining a virtual disk count, a segment size, and at least one indexed port identifier based on the referral response; and means for directing the I/O request from the initiator system to the block storage cluster based on the virtual disk count, the segment size, and the at least one indexed port identifier.

An additional embodiment of the present invention is directed to a computer-readable medium having computer-executable instructions for performing a method for communication between an initiator system and a block storage cluster. The method for communication between the initiator system and the block storage cluster may comprise initiating an input/output (I/O) request from the initiator system to a first storage system included in a plurality of storage systems of the block storage cluster, each of the plurality of storage systems comprising a plurality of data segments; receiving a referral response from the first storage system, the referral response providing information describing a layout of data requested in the I/O request; obtaining a virtual disk count, a segment size, and at least one indexed port identifier based on the referral response; and directing the I/O request from the initiator system to the block storage cluster based on the virtual disk count, the segment size, and the at least one indexed port identifier.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is an illustration of a referral list;

FIG. 3 is an illustration of a referral cache;

FIG. 4 is an illustration depicting the format of a referral response in accordance with the present disclosure;

FIG. 5 is an illustration of a referral response in accordance with the present disclosure;

FIG. 6 is an illustration of another referral response in accordance with the present disclosure;

FIG. 7 is an illustration depicting the format of an exception table;

FIG. 8 is an illustration of an exception table; and

DETAILED DESCRIPTION OF THE INVENTION

Reference will now be made in detail to the presently preferred embodiments of the invention, examples of which are illustrated in the accompanying drawings.

Figure 1:
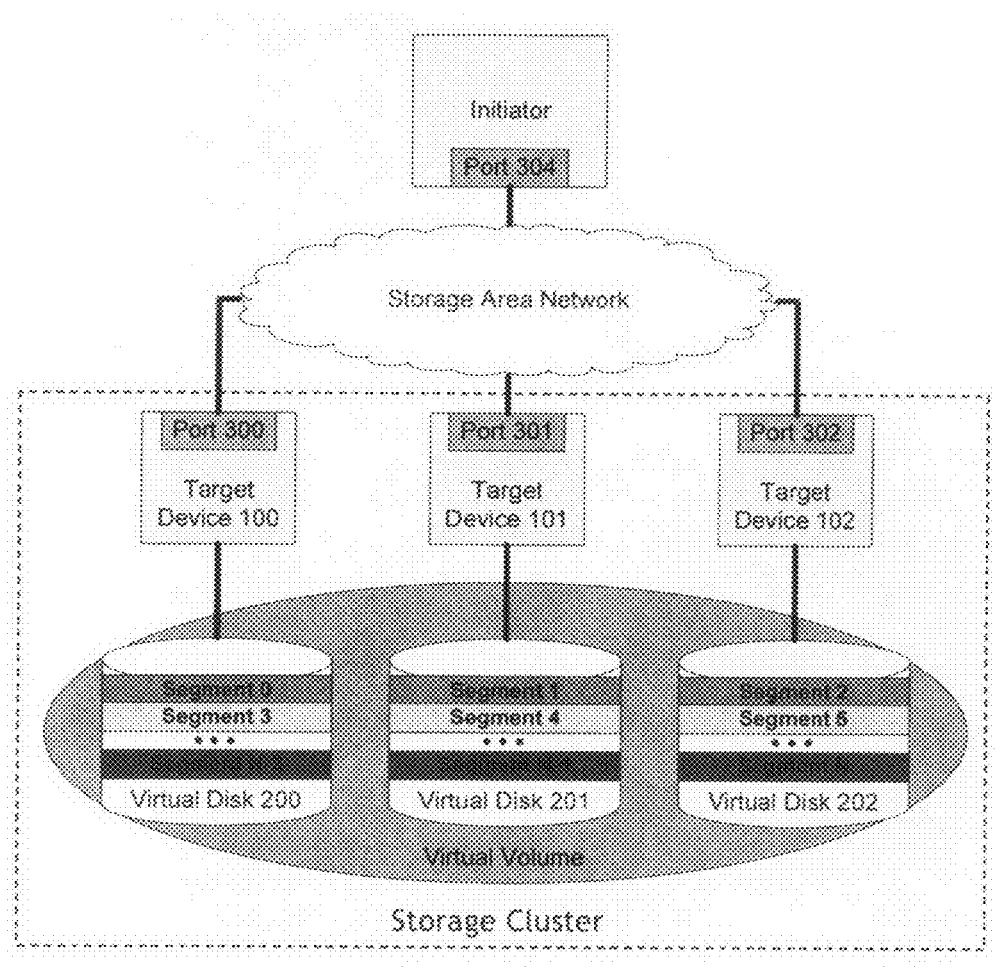
FIG. 1 is a networked storage implementation/system accessible via a block storage protocol in accordance with an exemplary embodiment of the present invention.

Referring to FIG. 1, a networked storage implementation/system accessible via a block storage protocol in accordance with an exemplary embodiment of the present disclosure is shown. An initiator system may be configured for accessing a block storage cluster via a storage area network.

Small Computer System Interface (SCSI) Input/Output (I/O) referral techniques may be utilized to facilitate communication between an initiator system and a block storage cluster. For example, the initiator system (e.g., a data requester) may transmit a data request command to a first storage system (e.g., target 100 through port 300) included in a plurality of storage systems of the block storage cluster.

When the data requested in the data request is stored in the first storage system, the data may be transferred to or from the initiator system. However, when a portion of the data requested is not stored by the first storage system, but is stored by a second storage system (e.g., target 101) included in the block storage cluster, a referral response may be transmitted from the first storage system to the initiator system. The referral response may provide an indication to the initiator system that not all of the requested data was transferred. The referral response may further provide information for directing the initiator system to the second storage system (e.g., accessing target 101 through port 301).

SCSI I/O referral techniques may enable an initiator system to access data on Logical Unit Numbers (LUNs) that are spread across a plurality of storage/target devices. These target devices may be disks, storage arrays, tape libraries, and/or other types of storage devices. It is understood that an I/O request may be a SCSI command, the first storage system may be a SCSI storage system, and the initiator system may be a SCSI initiator system. The SCSI command may identify the requested data by a starting address of the data and a length of the data in a volume logical block address space.

Techniques such as data striping may be utilized to create virtual volumes. As illustrated in FIG. 1, virtual volumes may be created by striping data segments over multiple virtual disks (virtual disks 200, 201 and 202). These data segments may be uniform in size. For example, each data segment (segment 0 through segment N in FIG. 1) may comprise 10 data blocks.

SCSI I/O referral responses that provide segment-specific referral information may not be efficient in storage systems where data striping is utilized. For example, the initiator system of FIG. 1 may issue a data request to port 300 for accessing logical block addresses (LBAs) starting at 100 for 100 blocks (this data request may be expressed as Port 300, LBA 100, Length 100). If each data segment in this configuration has a length of 10 blocks, then the data needed to service this I/O may be located in Segments 10 through 19. The above data request may result in an I/O referral list shown in FIG. 2.

FIG. 2 illustrates a list of segment-specific referrals. Each referral may be configured for providing a port identifier corresponding to a data segment. As illustrated in FIG. 2, because of the large number of data segments that are created by data striping, a large numbers of referrals may need to be generated. This may lead to large referral lists and large referral caches. For example, a fully populated initiator side referral cache for this configuration is illustrated in FIG. 3.

The present disclosure is directed to a method for communication between an initiator system and a block storage cluster. In one embodiment, the communication method is configured to support data segment striping by communicating enough information to allow initiators to decide which ports to use for each I/O request. The information provided to the initiators may describe the layout of the data requested in the I/O request. Such information may include, for example, the number of virtual disks involved in the virtual volume, the data segment size, and a list of indexed port identifier for accessing the virtual disks. The initiator systems may route the I/O requests based on such referral information.

Referring to FIG. 4, a referral response in accordance with an exemplary embodiment of the present disclosure is shown. In one embodiment, the referral response may comprise a virtual disk count indicating the number of virtual disks involved in the virtual volume, a segment size indicating the uniform size of the data segments in each of the virtual disks, and a list of indexed port identifiers for accessing the virtual disks.

For example, in the illustrated configuration shown in FIG. 1, the initiator may issue a data request Port 300, LBA 10, Length 20. If each data segment has a length of 10 blocks, then the data needed to complete this data request may be located in Segments 1 and 2. Since Segment 1 resides on virtual disk 201 and Segment 2 resides on virtual disk 202, the data request received at port 300 may not be fully serviced. Therefore, a referral response as illustrated in FIG. 5 may be generated and provided to the initiator.

The referral response of FIG. 5 indicates that the virtual disk count in this configuration is 3 and the segment size in this configuration is 10. The referral response also indicates that the port for accessing the virtual disk 201 (indexed "1") is through port 301; and the port for accessing the virtual disk 202 (indexed "2") is through port 302. Since no data stored by virtual disk 200 is needed to service the data request, the indexed port identifier for accessing virtual disk 200 may not be necessary and may not be provided as a part of this referral response.

The referral response depicted in FIG. 5 may be utilized to direct the data request to the storage cluster. For example, the initiator may split the original data request into a plurality of child requests upon receiving the referral response. In one embodiment, the initiator may calculate a lookup index based on the formula:

$$\text{Lookup Index} = (\text{LBA}/\text{Segment Size}) \bmod \text{Virtual Disk Count}$$

The initiator may also calculate a data segment offset based on the formula:

$$\text{Data Segment Offset} = \text{LBA} \bmod \text{Segment Size}$$

The calculated lookup index and offset may then be used to split the original data request into child requests.

For example, the initiator may split the data request Port 300, LBA 10, Length 20 into two child requests upon receiving referral response of FIG. 5. In this example, the lookup index may be calculated as (10/10) mod 3=1, and the data segment offset may be calculated as 10 mod 10=0. Therefore, the first child request may be directed to the port corresponding to the virtual disk indexed "1" (the lookup index), which is port 301. Since the offset in this example equals 0 (i.e., no offset), the first child request may be issued to port 301 starting at LBA 10 (the original LBA) for 10 blocks (data segment size). Similarly, the second child request may be issued to the subsequent data segment, i.e., to port 302 starting at LBA 20 (the original LBA plus the 10 blocks already requested in the first child request) for 10 blocks. Therefore, the original data request may be split in to two child requests Port 301, LBA 10, Length 10 and Port 302, LBA 20, Length 10 based on the referral response. These two child requests may be serviced by the storage cluster without further referrals.

In another example, the initiator may issue another data request Port 300, LBA 100, Length 100. If each data segment has a length of 10 blocks, then the data needed to service this data request may be located in Segments 10 through 19. Since the data request received at port 300 may not be fully serviced, a referral response as illustrated in FIG. 6 may be generated and provided to the initiator.

Similar to the above example, the initiator may split the data request Port 300, LBA 100, Length 100 into multiple child requests upon receiving the referral response. In this example, the lookup index may be calculated as (100/10) mod 3=1, and the data segment offset may be calculated as 100 mod 10=0. Therefore, the first child request may be directed to the port corresponding to the virtual disk indexed "1" (the lookup index), which is port 301. Since the offset in this example equals 0 (i.e., no offset), the first child request may be issued to port 301 starting at LBA 100 (the original LBA) for 10 blocks (data segment size). Similarly, the second child request may be issued to the subsequent data segment, i.e., to port 302 starting at LBA 110 (the original LBA plus the 10 blocks already requested in the first child request) for 10 blocks. The third child request may be issued to the subsequent data segment, i.e., to port 300 starting at LBA 120 (the original LBA plus the 20 blocks already requested in the first and second child request) for 10 blocks. Since the data request in this example has a total data length of 100, the process of generating child requests may continue in this manner until all of the requested blocks are covered. The child requests generated for data request Port 300, LBA 100, Length 100 may be as follows:

Port 301, LBA 100, Length 10
Port 302, LBA 110, Length 10
Port 300, LBA 120, Length 10
Port 301, LBA 130, Length 10
. . .
Port 301, LBA 190, Length 10

In still another example, the initiator may issue a data request Port 300, LBA 107, Length 100. If each data segment has a length of 10 blocks, then the data needed to service this data request may be located in Segments 10 through 20. Since the data request received at port 300 may not be fully serviced, a referral response as illustrated in FIG. 6 may be generated and provided to the initiator.

Similar to the above examples, the initiator may split the data request Port 300, LBA 107, Length 100 into multiple child requests upon receiving the referral response. In this example, the lookup index may be calculated as (107/10) mod 3=1, and the data segment offset may be calculated as 107 mod 10=7. Therefore, the first child request may be directed to the port corresponding to the virtual disk indexed "1" (the lookup index), which is port 301. Since the offset in this example equals 7, the first child request may be issued to port 301 starting at LBA 107 (the original LBA) for 3 blocks (data segment size minus the offset). The second child request may be issued to the subsequent data segment, i.e., to port 302 starting at LBA 110 (the original LBA 107 plus the 3 blocks already requested in the first child request) for 10 blocks. The third child request may be issued to the subsequent data segment, i.e., to port 300 starting at LBA 120 (the original LBA plus the 13 blocks already requested in the first and second child requests) for 10 blocks. The process of generating child requests may continue in this manner until all of the requested blocks are covered (i.e., covering the requested total data length of 100 blocks). The child requests generated for data request Port 300, LBA 107, Length 100 may be as follows:

Port 301, LBA 107, Length 3
Port 302, LBA 110, Length 10
Port 300, LBA 120, Length 10
Port 301, LBA 130, Length 10
. . .
Port 301, LBA 190, Length 10
Port 302, LBA 200, Length 7

It is contemplated that the referral responses may be stored. In one embodiment, a referral cache accessible to the initiator system may be utilized for storing the referral responses received. The referral cache may be populated over time based on the referral responses. Initiator systems may utilize the data stored in their corresponding referral caches to direct/route I/O requests. For example, when an I/O request needs to be transmitted from the initiator system to the block storage cluster, the initiator system may determine a requested LBA specified in the I/O request. The initiator system may calculate the lookup index and the offset based on the requested LBA, and split the I/O request when necessary based on the calculated information as previously described. The data stored in the referral cache may be of the same format as the referral response illustrated in FIGS. 4-6.

It is also contemplated that in certain configurations, utilizing data segment striping may require the data segments to be moved and/or relocated among virtual disks. In such a case the method described in this disclosure may be augmented with an exception table that records the location of the moved segments.

FIG. 7 illustrates an exemplary format for such an exception table. Initiator systems implementing the referral method of the present disclosure may utilize the method as previously described for directing data requests, and then determine whether an alternate port for accessing a particular segment is defined in the exception table. Target devices may communicate information shown in the exception table in FIG. 7 via a modified form of referral responses, for example, by concatenating the exception records to the previously described referral responses.

In the illustrated exemplary configuration shown in FIG. 1, suppose that Segment 10 originally resides on virtual disk 201 and is moved to virtual disk 200; Segment 11 originally resides on virtual disk 202 and is moved to virtual disk 200; and Segment 13 originally resides on virtual disk 201 and is moved to virtual disk 202. These exceptions may be represented by the exception records of the exception table illustrated in FIG. 8. These records may provide segment-specific port identifiers (IDs) reflecting the movements of Segments 10, 11 and 13. For example, due to relocation of Segment 10 from virtual disk 201 to virtual disk 200, Segment 10 now should be accessed through port 300.

Utilizing this exception table, child requests generated for a given request may be modified accordingly to handle the exceptions. For example, child requests generated for request Port 300, LBA 100, Length 100 may be modified as follows:

Port 300, LBA 100, Length 10
Port 300, LBA 110, Length 10
Port 300, LBA 120, Length 10
Port 302, LBA 130, Length 10
. . .
Port 301, LBA 190, Length 10

It is further contemplated that the modified child requests illustrated above may be coalesced if their exceptions direct them to the same ports. In the above example, the top three child requests may be coalesced to one request, therefore generating the following equivalent set of child requests for request Port 300, LBA 100, Length 100:

Port 300, LBA 100, Length 30
Port 302, LBA 130, Length 10
. . .
Port 301, LBA 190, Length 10

Figure 9:
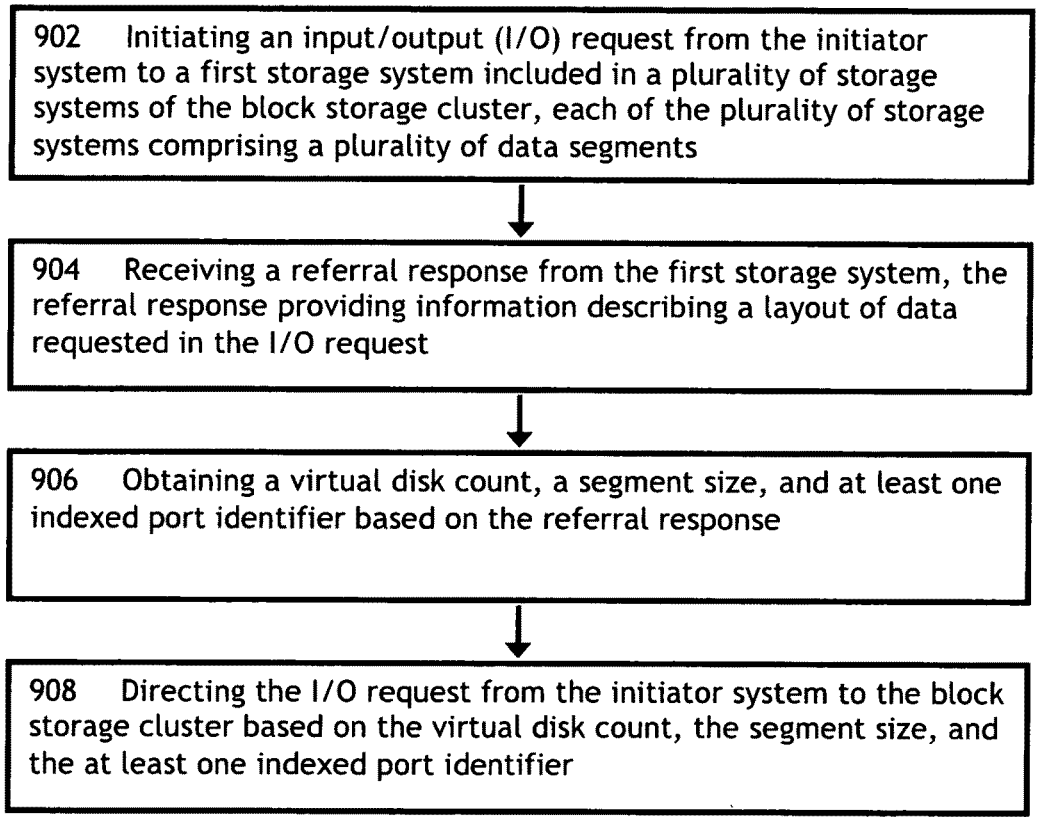
FIG. 9 is a flow chart illustrating a method for communication between an initiator system and a block storage cluster, in accordance with an exemplary embodiment of the present disclosure.

FIG. 9 shows a flow diagram illustrating steps performed by a communication method 900 in accordance with the present disclosure. The method 900 may be utilized in a storage infrastructure system for communication between an initiator system and a block storage cluster. The initiator system may initiate an input/output (I/O) request to a first storage system included in a plurality of storage systems of the block storage cluster in Step 902. The storage cluster may utilize data striping, therefore each of the plurality of storage systems may comprise a plurality of data segments. Step 904 may receive a referral response from the first storage system. The first referral response may provide information describing a layout of data requested in the I/O request. The layout may be described in terms of number of disks, segment size and one or more indexed port identifiers.

Step 906 may obtain a virtual disk count, a segment size, and a list of one or more indexed port identifiers based on the referral response. Step 908 may direct the I/O request from the initiator system to the block storage cluster based on the virtual disk count, the segment size, and the at least one indexed port identifier as previously described.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for communication via a network between an initiator system and a block storage cluster, the block storage cluster including multiple virtual disks and a plurality of storage systems, the plurality of storage systems at least including a first storage system and a second storage system, each storage system including at least one storage device, wherein the block storage cluster is configured to utilize data striping for creating at least one virtual volume by striping data segments over multiple virtual disks, the method comprising:

initiating an input/output (I/O) request from the initiator system to the first storage system included in the plurality of storage systems of the block storage cluster, each of the plurality of storage systems including a plurality of data segments;

receiving a referral response from the first storage system via a network when at least a portion of data associated with the I/O request from the initiator system is not stored or configured to be stored on the first storage system of the block storage cluster, the referral response including information which describes a layout of data requested in the I/O request, wherein the information of the referral response includes a virtual disk count, a segment size, and at least one indexed port identifier;

obtaining the virtual disk count, the segment size, and the at least one indexed port identifier based on the referral response received from the first storage system of the block storage cluster;

deciding to direct each of one or more I/O requests to a particular storage system of the plurality of storage systems based upon the virtual disk count, the segment size, and the at least one indexed port identifier obtained from the referral response received from the first storage system; and directing each of the one or more I/O requests to the particular storage system of the plurality of storage systems according to the layout of data described by the referral response, each of the one or more I/O requests being a particular I/O request from the initiator system to the particular storage system of the block storage cluster based on the virtual disk count, the segment size, and the at least one indexed port identifier, wherein at least one of the one or more I/O requests is directed to the second storage system of the plurality of storage systems.

2. The method as claimed in claim 1, wherein the plurality of data segments of the plurality of storage systems are of a uniform size.

3. The method as claimed in claim 2, wherein deciding to direct each of one or more I/O requests to a particular storage system of the plurality of storage systems based upon the virtual disk count, the segment size, and the at least one indexed port identifier obtained from the referral response received from the first storage system further comprises:

determining a logical block address (LBA) and a total data length specified in the I/O request;

calculating a lookup index based on the LBA, the segment size, and the virtual disk count; and locating a corresponding indexed port identifier based on the lookup index; and wherein directing each of the one or more I/O requests to the particular storage system of the plurality of storage systems according to the layout of data described by the referral response, each of the one or more I/O requests being a particular I/O request from the initiator system to the particular storage system of the block storage cluster based on the virtual disk count, the segment size, and the at least one indexed port identifier further comprises:

directing each of the one or more I/O requests to the particular storage system of the plurality of storage systems according to the layout of data described by the referral response, each of the one or more I/O requests being a particular I/O request from the initiator system to the particular storage system of the block storage cluster based on the virtual disk count, the segment size, the at least one indexed port identifier, the corresponding indexed port identifier, the LBA, and the total data length.

4. The method as claimed in claim 2, wherein the one or more I/O requests comprise a plurality of child I/O requests, wherein deciding to direct each of one or more I/O requests to a particular storage system of the plurality of storage systems based upon the virtual disk count, the segment size, and the at least one indexed port identifier obtained from the referral response received from the first storage system further comprises:

determining a logical block address (LBA) and a total data length specified in the I/O request;

calculating a lookup index based on the LBA, the segment size, and the virtual disk count;

calculating a data segment offset based on the LBA and the segment size;

determining whether the I/O request spans more than one data segment;

splitting the I/O request into the plurality of child I/O requests based on the LBA, the total data length, the data segment offset and at least one data segment boundary when the I/O request spans more than one data segment; and wherein directing each of the one or more I/O requests to the particular storage system of the plurality of storage systems according to the layout of data described by the referral response, each of the one or more I/O requests being a particular I/O request from the initiator system to the particular storage system of the block storage cluster based on the virtual disk count, the segment size, and the at least one indexed port identifier further comprises:

directing each of the plurality of child I/O requests to the particular storage system of the plurality of storage systems according to the layout of data described by the referral response, each of the plurality of child I/O requests being a particular I/O request from the initiator system to the particular storage system of the block storage cluster based on the virtual disk count, the segment size, and the at least one indexed port identifier.

5. The method as claimed in claim 1, further comprising: storing the virtual disk count, the segment size, and the at least one indexed port identifier in a referral cache accessible to the initiator system.

6. The method as claimed in claim 1, wherein the referral response further comprises at least one exception record providing a segment-specific port identifier.

7. The method as claimed in claim 1, wherein the I/O request is a Small Computer System Interface (SCSI) command, the first storage system is a SCSI storage system, the second storage system is a SCSI storage system, and the initiator system is a SCSI initiator system.

8. A storage infrastructure, said storage infrastructure including a block storage cluster, said block storage cluster including multiple virtual disks and a plurality of storage systems, the plurality of storage systems at least including a first storage system and a second storage system, each storage system including at least one storage device, wherein the block storage cluster is configured to utilize data striping for creating at least one virtual volume by striping data segments over multiple virtual disks, wherein said block storage cluster is configured to communicate via a network with an initiator system, said storage infrastructure comprising:

means for initiating an input/output (I/O) request from the initiator system to the first storage system included in the plurality of storage systems of the block storage cluster, each of the plurality of storage systems including a plurality of data segments, the plurality of data segments being of a uniform size;

means for receiving a referral response from the first storage system via a network when at least a portion of data associated with the I/O request from the initiator system is not stored or configured to be stored on the first storage system of the block storage cluster, the referral response including information which describes a layout of data requested in the I/O request, wherein the information of the referral response includes a virtual disk count, a segment size, and at least one indexed port identifier;

means for obtaining the virtual disk count, the segment size, and the at least one indexed port identifier based on the referral response received from the first storage system of the block storage cluster;

deciding where to direct each of a plurality of I/O requests to a particular storage system of the plurality of storage systems based upon the virtual disk count, the segment size, and the at least one indexed port identifier obtained from the referral response received from the first storage system, wherein deciding where to direct each of the plurality of I/O requests to the particular storage system of the plurality of storage systems based upon the virtual disk count, the segment size, and the at least one indexed port identifier obtained from the referral response received from the first storage system further comprises:

determining a logical block address (LBA) and a total data length specified in the I/O request;

calculating a lookup index based on the LBA, the segment size, and the virtual disk count; and locating a corresponding indexed port identifier based on the lookup index; and means for directing each of the plurality of I/O requests to the particular storage system of the plurality of storage systems according to the layout of data described by the referral response, each of the plurality of I/O requests being a particular I/O request from the initiator system to the particular storage system of the block storage cluster based on the virtual disk count, the segment size, the at least one indexed port identifier, the corresponding indexed port identifier, the LBA, and the total data length, wherein at least one of the plurality of I/O requests is directed to the second storage system of the plurality of storage systems.

9. The storage infrastructure as claimed in claim 8, further comprising:

means for storing the virtual disk count, the segment size, and the at least one indexed port identifier in a referral cache accessible to the initiator system.

10. The storage infrastructure as claimed in claim 8, wherein the referral response further comprises at least one exception record providing a segment-specific port identifier.

11. The storage infrastructure as claimed in claim 8, wherein the I/O request is a Small Computer System Interface (SCSI) command, the first storage system is a SCSI storage system, the second storage system is a SCSI storage system, and the initiator system is a SCSI initiator system.

12. A non-transitory computer-readable storage medium having computer-executable instructions for performing a method for communication via a network between an initiator system and a block storage cluster, the block storage cluster including multiple virtual disks and a plurality of storage systems, the plurality of storage systems at least including a first storage system and a second storage system, each storage system including at least one storage device, said method comprising:

initiating an input/output (I/O) request from the initiator system to the first storage system included in the plurality of storage systems of the block storage cluster, each of the plurality of storage systems including comprising a plurality of data segments, the plurality of data segments being of a uniform size;

receiving a referral response from the first storage system via a network when at least a portion of data associated with the I/O request from the initiator system is not stored or configured to be stored on the first storage system of the block storage cluster, the referral response including information which describes a layout of data requested in the I/O request, wherein the information of the referral response includes a virtual disk count, a segment size, and at least one indexed port identifier;

obtaining the virtual disk count, the segment size, and the at least one indexed port identifier based on the referral response received from the first storage system of the block storage cluster;

deciding where to direct each of a plurality of child I/O requests to a particular storage system of the plurality of storage systems based upon the virtual disk count, the segment size, and the at least one indexed port identifier obtained from the referral response received from the first storage system, wherein deciding where to direct each of the plurality of child I/O requests to the particular storage system of the plurality of storage systems based upon the virtual disk count, the segment size, and the at least one indexed port identifier obtained from the referral response received from the first storage system further comprises:

determining a logical block address (LBA) and a total data length specified in the I/O request;

calculating a lookup index based on the LBA, the segment size, and the virtual disk count;

calculating a data segment offset based on the LBA and the segment size;

determining whether the I/O request spans more than one data segment; and splitting the I/O request into the plurality of child I/O requests based on the LBA, the total data length, the data segment offset and at least one data segment boundary when the I/O request spans more than one data segment; and directing each of the plurality of child I/O requests to the particular storage system of the plurality of storage systems according to the layout of data described by the referral response, each of the plurality of child I/O requests being a particular I/O request from the initiator system to the particular storage system of the block storage cluster based on the virtual disk count, the segment size, and the at least one indexed port identifier, wherein at least one of the plurality of child I/O requests is directed to the second storage system of the plurality of storage systems.

13. The non-transitory computer-readable storage medium as claimed in claim 12, further comprising:

storing the virtual disk count, the segment size, and the at least one indexed port identifier in a referral cache accessible to the initiator system.

14. The non-transitory computer-readable storage medium as claimed in claim 12, wherein the referral response further comprising at least one exception record providing a segment-specific port identifier.

15. The method as claimed in claim 1, wherein the referral response comprises a single referral response, and wherein the one or more I/O requests comprises a plurality of I/O requests.

16. The method as claimed in claim 1, wherein the referral response comprises a single referral response, wherein the one or more I/O requests comprises a plurality of I/O requests, wherein the plurality of storage systems further includes a third storage system, and wherein at least one of the plurality of I/O requests is directed to the third storage system of the plurality of storage systems.

17. The method as claimed in claim 1, further comprising:

moving at least one data segment between virtual disks of the multiple virtual disks; and recording a location of moved data segments in an exception table.

18. The storage infrastructure as claimed in claim 8, wherein the referral response comprises a single referral response, wherein the plurality of storage systems further includes a third storage system, and wherein at least one of the plurality of I/O requests is directed to the third storage system of the plurality of storage systems.

19. The storage infrastructure as claimed in claim 8, further comprising:

means for moving at least one data segment between virtual disks of the multiple virtual disks; and means for recording a location of moved data segments in an exception table.

20. The non-transitory computer-readable storage medium as claimed in claim 12, wherein the referral response comprises a single referral response, wherein the plurality of storage systems further includes a third storage system, and wherein at least one of the plurality of child I/O requests is directed to the third storage system of the plurality of storage systems.

* * * * *